United States Patent [19]

Blight

[11] Patent Number: 4,793,027

[45] Date of Patent: Dec. 27, 1988

[54] FISH FILLETING KIT

[76] Inventor: Alfred Blight, 240 Bluefield Rd., Lexington, S.C. 29072

[21] Appl. No.: 142,955

[22] Filed: Jan. 12, 1988

[51] Int. Cl.⁴ .......................................... A22C 25/06
[52] U.S. Cl. ................................................ 17/70
[58] Field of Search ........................... 17/70, 44.3, 68

[56] References Cited

U.S. PATENT DOCUMENTS

| | | | |
|---|---|---|---|
| 2,523,736 | 9/1947 | Swetlik | 17/8 |
| 2,979,763 | 4/1961 | Stabryla | 17/8 |
| 3,016,565 | 1/1962 | Hill | 17/8 |
| 3,178,766 | 4/1965 | Bednar | 17/8 |
| 3,248,751 | 5/1966 | Wilborn | 17/8 |
| 4,127,919 | 12/1978 | Buddecke | 17/70 |
| 4,454,630 | 6/1984 | Shouldis | 17/70 |

FOREIGN PATENT DOCUMENTS 28751  4/1918  Norway .................................. 17/70

*Primary Examiner*—Willie G. Abercrombie
*Attorney, Agent, or Firm*—Benoni O. Reynolds

[57] ABSTRACT

A fish filleting kit wherein a gate arm having a plurality of dependent pins holds the fish to be filleted by the tail against a supporting board. A revolving locking arm and a vertical stop hold the gate arm temporarily in place during the filleting process. To permit frequent and efficient sharpening of the filleting knife, the kit includes a knife sharpener attached conveniently atop one end of the supporting board. A ruler is provided on one side of the supporting board to assist in an accurate division of the fillet being carved.

3 Claims, 1 Drawing Sheet

FISH FILLETING KIT

BACKGROUND OF THE INVENTION (1) Field of Invention

The present invention relates to apparatus for the art of fish filleting. More particularly the invention is concerned with apparatus for the filleting of an uncooked fish by holding the fish securely while assisting the person performing the carving to make an accurate and clean cut.

(2) Description of the Prior Art

The filleting of a fish is a difficult and important operation. The bones of a fish, frequently small and white or translucent, are difficult to see. Also, there are usually a good many of these tiny bones. Separating the fish flesh from the fish bones not only makes eating fish more pleasant but also safer. As more people have come to recognize the value of fish as a nutritious food source, the eating of fish has increased in popularity. However, many people still avoid eating fish or serving fish because they are concerned about children swallowing fish bones or because they do not want to deal with the fish bones themselves.

Filleting a fish properly requires a very sharp knife and a firmly held fish. Working one side of the fish at a time, initial incisions are usually made along the side of the backbone and behind the gills of the fish. Then the flesh is lifted from the larger bones using the knife to separate the flesh from the rib cage of the fish. Without a sharp knife and a firmly held fish, the fish can easily become mangled or the process performed inefficiently. To be sharp, the knife must be resharpened frequently. Holding a fish with one hand and carving with the other hand obviously can be unsatisfactory and inefficient. Not only is a freshly caught fish difficult to hold with one hand but also the filleting or carving process can be enhanced if a hand is available to lift the fillet as the fish is filleted. Also the use of some clamping means enables the person doing the filleting to better see the relationship between the bones and the knife.

There are a number of filleting apparatuses that have been patented which feature various means for holding the fish to be filleted. However, none have the efficiency and ease of operation of the present invention nor do they have knife sharpeners or measuring devices as an integral part of the apparatus holding the fish.

U.S. Pat. No. 2,523,736, issued to Swetlik in 1950, features a row of pointed prongs on a clamp. His clamp has no supporting board under the fish to provide a cutting surface and has no locking means to lock the clamp onto the tail of the fish to be filleted. U.S. Pat. No. 3,016,565 discloses Hill's fish handling and scaling jig which holds a fish by the tail using the teeth of a latching arm that locks into a vertical latch stand. Wilburn's fish cleaning device, U.S. Pat. No. 3,248,751, holds the fish to be filleted by means of a toothed clamp held under the pressure of a pivoting rod. Buddecke's catfish killer and holder, U.S. Pat. No. 4,127,919, features a single spike to kill the catfish by impaling the head of the catfish held in a box-like structure at one end of a board.

None of the above cited references holds the fish to be filleted as firmly and as simply as the instant invention. Some prior art devices are not positive in operation and others are awkward to open and close. None has a knife sharpener conveniently located thereon for frequent sharpening of a filleting knife. None has a measuring device conveniently placed to permit an accurate measurement of the length of the fish and accurate segmentation of the fillet carved therefrom.

The present invention is simple to manufacture and easy to use. It is positive in its operation. The hobby fisherman or woman, and the professional, can fillet his or her catch efficiently, quickly and accurately with this Fish Filleting Kit. Prior art known to this inventor includes the following U.S. Pat. Nos.:

2,523,736, 9/1950, Swetlik,
2,979,763, 4/1961, Stabryla,
3,016,565, 1/1962, Hill,
3,178,766, 4/1965, Bednar,
3,248,751, 5/1966, Wilborn,
4,127,919, 12/1987, Buddecke.

BRIEF SUMMARY OF THE INVENTION

The present invention is a Fish Filleting Kit which facilitates the filleting of an uncooked fish by holding the fish securely while assisting the person performing the filleting to make a clean and accurate cut. Prior art filleting devices do not hold the fish firmly and are awkward to use. The present invention overcomes these problems in one self-contained unit plus providing additional features which assist and speed up the filleting process.

According to the preferred embodiment of this invention, a supporting board is provided for underlaying the fish to be filleted. The supporting board, of course, must be large enough to support the largest fish to be filleted. A mounting block is attached to the supporting board near one end of the upper surface of the supporting board, the mounting block being at least as thick as the thickest fish to be filleted. A clamping means is attached to the upper surface of the mounting block to hold the fish in place while it is being filleted. A locking means is attached to the mounting block and the supporting board to hold the clamping means in an extended position temporarily during the filleting process.

Clamping means is a gate arm having a plurality of pins. The gate arm is attached at one end, by a hinge, to the upper center of the mounting block and extends over the tail of the fish to be filleted. By means of the hinge, the gate arm is free to rotate about a horizontal axis perpendicular to the long axis of the supporting board. The length of the gate arm, of course, is at least as long as the tail of the longest fish to be filleted. The plurality of pins is attached to the underside of the free end of the gate arm so that, when the gate arm is extended fully over the fish to be filleted, the pins depend downwardly to just touch the upper surface of the supporting board, impaling and thereby securing the fish by its tail. Each pin is tapered to a sharp point, the taper beginning one-half to one inch from the free end of the pin.

Locking means is a locking arm attached, off center, to the top of the mounting block and a vertical stop, mounted on a long side of the supporting board. The locking arm is bent at a right angle at its free end and is free to rotate in a horizontal plane, just above the gate arm, when the gate arm is in the fully extended and closed position. The vertical stop extends upwardly to stop the horizontal rotation of the locking arm at a point when the locking arm is directly over the gate arm in its fully extended and closed position. Also, the vertical stop is bent at right angles at its top to prevent inadvertent lifting of the locking arm when the locking arm is thus positioned directly over the gate arm.

The instant invention has other features which speed up and facilitate the filleting process. As a very sharp knife is an essential to the filleting process, a knife sharpener is attached to the upper surface of the supporting board, between the mounting block and the nearest side of the supporting board and perpendicular thereto. The knife sharpener is positioned so that a knife may be drawn across the sharpening faces of the knife sharpener in a direction approximately perpendicular to the long axis of the supporting board. Ideally, the knife sharpener is made of stainless steel alloy to minimize corrosion and enhance cleaning of the knife sharpener.

Another feature is the provision of a measuring means which is attached to one long side of the supporting board for use in determining the length of the fish to be filleted. The measuring means also is useful for dividing the resulting fillet into measured segments. Measuring means in the present invention as illustrated is a ruler on one of the long sides of the supporting board.

OBJECTIVES OF THE INVENTION

The objectives of the present invention are to provide a Fish Filleting Kit for filleting uncooked fish which:
(1) will permit free use of ones hands during the filleting process;
(2) will provide all needed elements for an efficient filleting operation;
(3) is simply constructed with few moving parts;
(4) will hold the fish to be filleted securely throughout the filleting process;
(5) will provide means for easily resharpening a filleting knife at frequent intervals;
(6) is safe for the novice filleter to use;
(7) will provide measuring means for determining the length of fish or size of fillet segments;
(8) can handle various size fish without adjustments;
(9) can be easily cleaned and stored;

DETAILED DESCRIPTION OF THE PREFERRED EMBODIMENT OF THE INVENTION

Figure 1:
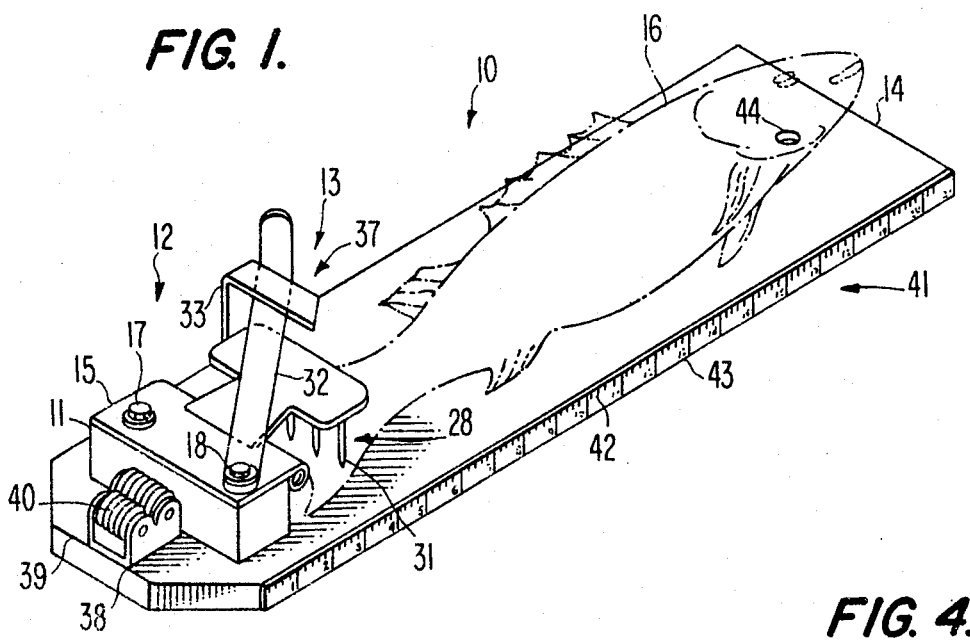
FIG. 1 is a perspective view from the left front of a Fish Filleting Kit constructed in accordance with the principles of the present invention, showing the top surface of the supporting board, the mounting block, the clamping means and the locking means.

The Fish Filleting Kit is a heavy duty, self-contained apparatus which will enable the user to quickly and efficiently fillet an uncooked fish with no other instrument than a sharp knife. The fish is easily inserted in the apparatus and is held securely leaving both hands free for the filtering operation. Throughout the following detailed description of the present invention, like reference numerals are used to denote like parts disclosed in the accompanying drawings, FIGS. 1-6.

As shown in FIG. 1, the preferred embodiment of the present invention comprises a supporting board, shown generally at reference numeral 10, for underlaying the fish to be filleted, a mounting block 11, a clamping means, shown generally at reference numeral 12, and a locking means, shown generally at reference numeral 13. The supporting board 10, is large enough to support the largest fish to be filleted. Typically it is made of a hard wood, such as oak, and sawed rectangularly to the desired width and length, usually about 6 inches by 24 inches.

Mounting block 11 is attached to supporting board 10 near one end of upper surface 14 of supporting board 10 and is at least as thick as the thickest fish to be filleted. Typically mounting block 11 is made of a hard wood, such as oak, and is sawed to a rectangular block, 2 inches by 2 inches square, and 4¾ inches long.

Figure 4:
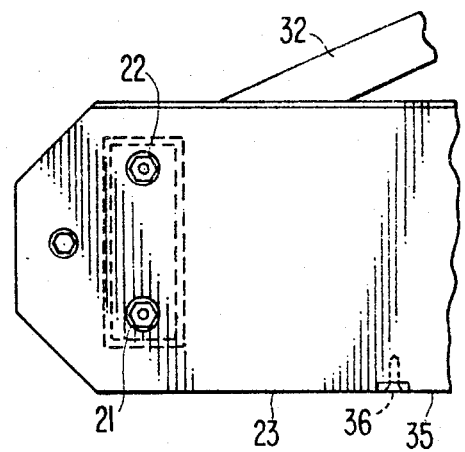
FIG. 4 is a bottom view of the left portion of the present invention.
Figure 3:
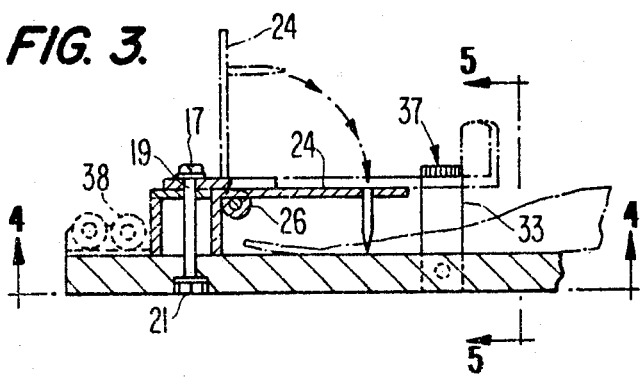
FIG. 3 is a cross-sectional view taken substantially along line 3—3 of FIG. 2, showing how the gate arm of the present invention moves up and down to permit the placing of the fish tail upon the supporting board.
Figure 5:
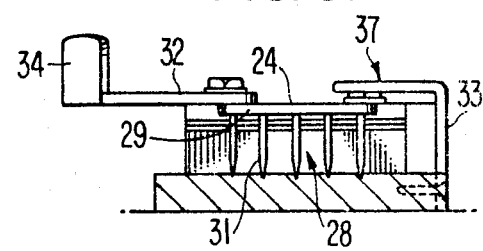
FIG. 5 is a cross-sectional view of the present invention from the far right end, showing the plurality of tapered pins which impale the fish tail against the upper surface of the supporting board.
Figure 6:
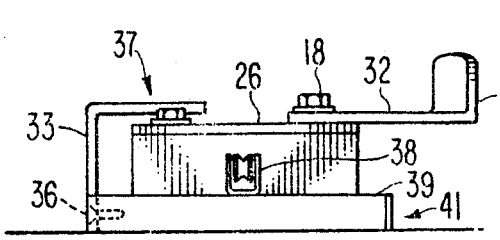
FIG. 6 is a view from the left end of the present invention, showing the relative positions of the vertical sto and the locking arm.

As further shown in FIG. 1, clamping means 12 is attached to the upper surface 15 of mounting block 11 to hold fish 16 in place while it is being filleted. Clamping means 12 is secured to mounting block 11 and supporting board 10 by two machine bolts 17 and 18 which are inserted through holes 19 and 20 (not shown), respectively, which have been bored by a drill press through mounting block 11 and supporting board 10. As best shown in FIGS. 3 and 4, the machine bolts 17 and 18 are then secured tightly by two nuts 21 and 22 which are countersunk into the lower surface 23 of supporting board 10.

Locking means 13, is attached to mounting block 11 and supporting board 10 to hold clamping means 12 in an extended and closed position temporarily during the filleting process. Locking means 13 is made of steel or aluminum flat stock ¾ inch in width and 1/16 inch in thickness.

Clamping means 12 is a gate arm 24 attached at one end 25 by a hinge 26 to the upper center of mounting block 11 and a plurality of pins, shown generally at reference numeral 28, attached to the underside of the free end 29 of gate arm 24 so that, when gate arm 24 is extended fully over the fish 16 to be filleted, pins 28 depend downwardly to just touch the upper surface 14 of supporting board 10, impaling and thereby securing fish 16 by its tail. As best shown in FIG. 3, gate arm 24 extends over the tail of the fish 16 to be filleted and is free to rotate about a horizontal axis perpendicular to the long axis of supporting board 10. The length of gate arm 24 is at least as long as the tail of the longest fish to be filleted.

Figure 2:
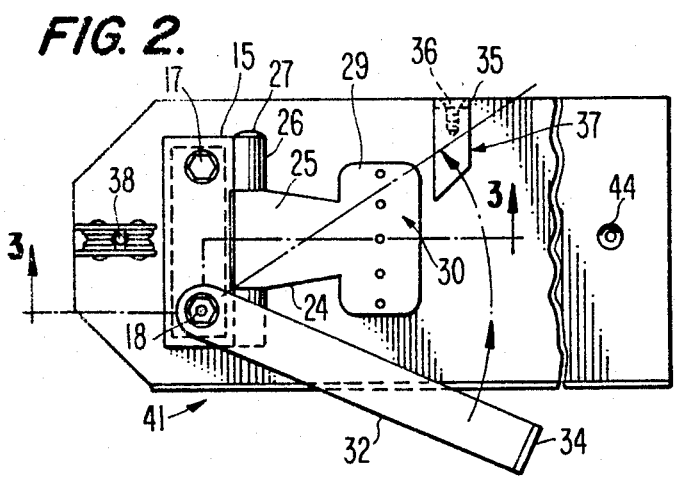
FIG. 2 is a plan view of the same present invention showing the gate arm of the clamping means in a fully extended but unlocked position.

Hinge 26 and gate arm 24 are typically made of steel or aluminum and die cut or molded to the desired shape and dimensions. Gate arm 24 is secured to hinge 26 by pin 27. Gate arm 24 is normally die cut to a mushroom-like shape for safety and appearance, as shown in FIG. 2. Then five holes, shown generally at reference numeral 30, are punched by a punch press into free end 29 of gate arm 24 to receive pins 28. Each of the pins 28 is made of steel, about 1½ inches in length and is tapered, for a finished look, to a sharp point, the taper beginning about one-half to one inch from free end 31 of the pin. Nails could be used for pins 28 or the pins could be made by an automatic screw machine. The pins 28 can be soldered or welded to gate arm 24.

As shown in FIG. 1, locking means 13 is a locking arm 32 and a vertical stop 33. Locking arm 32 is attached, off center, to the top of mounting block 11. Locking arm 32 is bent at a right angle at its free end 34 and is free to rotate about machine bolt 18 in a horizontal plane, just above gate arm 24 when gate arm 24 is in the fully extended and closed position. Vertical stop 33 is mounted on a long side 35 of supporting board 10 and extends upwardly to stop the horizontal rotation of locking arm 32 when locking arm 32 is directly over gate arm 24 horizontally when gate arm 24 is in its fully extended and closed position. Vertical stop 33 is attached to a long side 35 by a wood screw 36 and is recessed into long side 35 for safety and strength. Also vertical stop 33 is bent at right angles at its top, shown generally at reference numeral 37, to prevent inadvertent lifting of locking arm 32 when locking arm 32 is thus positioned directly over gate arm 24.

A knife sharpener 38 is attached to the upper surface 14 of supporting board 10 between mounting block 11 and the nearest side 39 of supporting board 10 and perpendicular thereto. Knife sharpener 38 is positioned so that a knife (not shown) may be drawn across the sharpening faces 40 of knife sharpener 38 in a direction approximately perpendicular to the long axis of supporting board 10. Ideally, knife sharpener 38 is made of stainless steel alloy to minimize corrosion and to enhance cleaning of knife sharpener 38.

A measuring means, shown generally at reference numeral 41, is attached to one long side 42 of supporting board 10 for use in determining the length of the fish to be filleted and for dividing the resulting fillet into measured segments (not shown). As shown in FIG. 1, measuring means is a ruler 43 on one of the long sides 42 of supporting board 10.

A small hole 44 is countersunk in the center of the right end of supporting board 10 to facilitate storing the Fish Filleting Kit on a nail or hook (not shown) affixed to a wall.

In operation, locking arm 32 is rotated clockwise from under top 37 of vertical stop 33 so that is clear of the top of gate arm 24 as shown best in FIG. 2. Gate arm 24 is then lifted up by its free end 29 and fish 16 is placed flat on its side on supporting board 10 so that its tail is fully against mounting block 11. Gate arm 24 is then lowered over and into the tail of the fish to be filleted, impaling and securing the fish against upper surface 14 of supporting board 10. Locking arm 32 is then grasped by its free end 34 and rotated counterclockwise over gate arm 24 in its fully extended and closed position until locking arm 32 rests against vertical stop 33 and under the horizontal extension, top 37, of the vertical stop 33. The user than can proceed to fillet the fish in the conventional manner with his hands free to lift the fillet segments (not shown) as the user cuts along the back bone and around the gills of the fish.

Knife sharpener 38 and measuring means 41 are both readily accessible to quickly resharpen the knife (not shown) or to measure the fillet segments (not shown) as the filleting process progresses.

I claim:
1. Apparatus for filleting fish comprising:
   a supporting board, for underlaying the fish to be filleted, which supporting board is large enough to support the largest fish to be filleted, and
   a mounting block, attached to said supporting board near one end of the upper surface of said supporting board, which mounting block is at least as thick as the thickest fish to be filleted, and
   a clamping means, attached to said upper surface of said mounting block, to hold said fish in place while it is being filleted, which clamping means is
   a gate arm, attached at one end by a hinge to the upper center of said mounting block, which gate arm extends over the tail of the fish to be filleted and is free to rotate about a horizontal axis perpendicular to the long axis of said support board, the length of said gate arm being at least as long as the tail of the longest fish to be filleted, and
   a plurality of pins attached to the underside of the free end of said gate arm so that, when said gate arm is extended fully over the fish to be filleted, said pins depend downwardly to just touch the upper surface of said supporting board, impaling and thereby securing said fish by its tail, and
   a locking means, attached to said mounting block and said supporting board, to hold said clamping means in an extended and closed position temporarily during the filleting process.

2. The apparatus of claim 1 wherein each said pin is tapered to a sharp point, the taper beginning one-half to one inch from the free end of said pin.

3. The apparatus of claim 1 wherein locking means is
   a locking arm attached, off center, to the top of said mounting block, which locking arm is bent at a right angle at its free end and is free to rotate in a horizontal plane, just above said gate arm, when said gate arm is in the fully extended and closed position, and
   a vertical stop, mounted on a long side of said supporting board, which vertical stop extends upwardly to stop the horizontal rotation of said locking arm at a point when said locking arm is directly over said gate arm horizontally when said gate arm is in its fully extended and closed position and which vertical stop is bent at right angles at its top to prevent inadvertent lifting of said locking arm when said locking arm is thus positioned directly over said gate arm.

* * * * *